April 2, 1935.  J. VASS  1,996,600
MECHANICAL TOY
Filed April 7, 1934
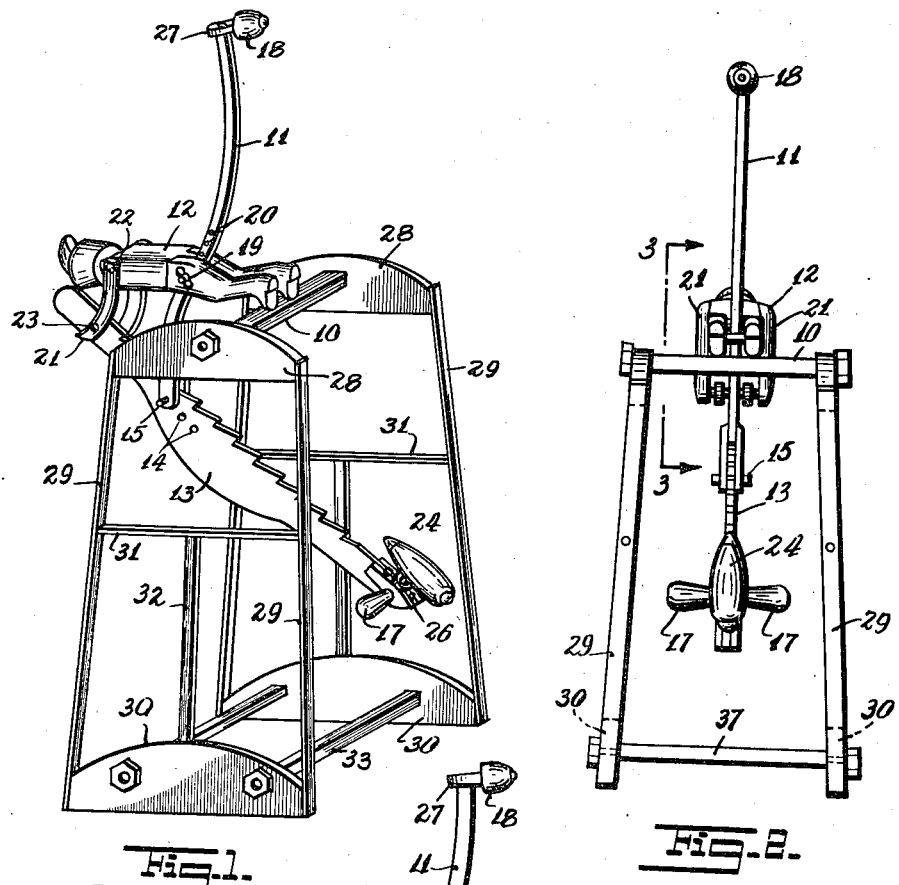
Fig. 1.
Fig. 2.
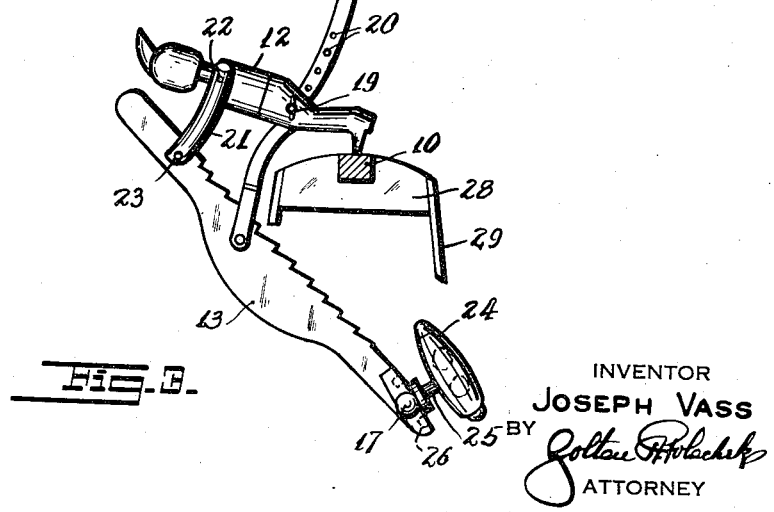
Fig. 3.
INVENTOR
JOSEPH VASS
BY
ATTORNEY Patented Apr. 2, 1935

1,996,600

UNITED STATES PATENT OFFICE 1,996,600

MECHANICAL TOY

Joseph Vass, Sharpsville, Pa.

Application April 7, 1934, Serial No. 719,431

3 Claims. (Cl. 46—40)

This invention relates to new and useful improvements in mechanical toys.

The invention has for an object the construction of a mechanical toy which is characterized by a simulation of a manikin riding upon a manikin support bar, connected with a saw, and balanced upon a horizontal bar in such a manner that upon swinging of the saw and the manikin there is the appearance that the manikin is operating the saw.

More particularly the invention has particular reference to the arrangement of the manikin upon a manikin support bar and the relation of the support bar and manikin to the saw.

Still further it is proposed to provide an arrangement whereby the manikin support bar is adjustably related to the support bar and the saw so that the toy may be operated in various positions of the manikin for entertainment.

Furthermore as another object of this invention an arrangement is proposed whereby the structure of the saw, the manikin support bar, and the manikin may be easily balanced upon the horizontal bar.

Still further the invention proposes the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a mechanical toy constructed according to this invention.

Fig. 2 is a side view of Fig. 1.

Fig. 3 is a fragmentary sectional view on the line 3—3 of Fig. 2.

The mechanical toy according to this invention comprises a supported horizontal bar 10 supporting a structure transversely balanced thereon and comprising a manikin support bar 11, a manikin 12 and a saw 13. The manikin support bar 11 extends substantially vertically and above the horizontal bar 10. The saw 13 is pivotally connected with the manikin support bar 11 and extends in the other direction, downwards, from the horizontal bar 10. A pin 15 connects the lower end of the support bar 11 with the saw and is engageable with other apertures 14 in the saw for the purpose of holding these parts in fixed adjustable relation.

The manikin support bar 11 is of curved construction so that the free end is extended substantially over the bar 10, and the saw 13 also extends laterally beneath the bar 10 so that the balanced structure has a low center of gravity compared with the horizontal supporting bar 10 so the structure will not easily fall from the horizontal bar when it is oscillated during use.

Furthermore a handle 17 is mounted upon the free end of the saw 13. A weight 18 is mounted upon the free end of the manikin support bar 11 for the purpose of adding mass to the balanced structure so that it may be oscillated slowly and given sufficient momentum to keep oscillating for a short period of time. The manikin 12 is shown arranged sitting upon the manikin support bar 11. A pin 19 engages through the manikin and into one of a plurality of openings 20 along the length of the manikin support bar 11 so that the manikin may be mounted pivotally at various positions along the length of the manikin support bar. The manikin 12 has arms 21 pivotally connected at 22 upon the shoulders of the manikin. These arms 21 are extended to the end of the saw 13 and a pin 23 engages through the ends of the arms and the end of the saw for pivotally connecting these parts. A balancing weight 24 of egg shape and loaded with lead is provided with a stem 25 adapted to engage one of a plurality of openings 26 formed along the handle end of the saw 13 to facilitate swivelling and adjustable for the balancing of the balanced structure. The weight 18 is also loaded with lead and on a stem 27 swivelly mounted on the end of the manikin support bar 11 so that adjustment is possible for the purpose of also facilitating balancing of the balanced structure.

The horizontal rod 10 is supported upon a standard which comprises a pair of identical side members each consisting of top blocks 28 supported by side arms 29 mounted upon base blocks 30. Reinforcement strips 31 and 32 are mounted within the side arms 29 for reinforcing the structures. The horizontal bar 10 is mounted between the top blocks 28. Rods 33 are mounted between the bottom blocks 30 and in this manner the standard is of rigid construction.

The operation of the device may be understood by assuming it in the condition illustrated in Fig. 1. In this condition the saw, the manikin and the manikin support bar are balanced upon the horizontal bar 10. The free end of the saw 13 or the free end of the manikin support bar 11 may be moved so as to cause the balance structure to swing back and forth on its own momentum. This motion simulates the manikin operating the saw and keeping it in an attractive position, substantially horizontal with the toes on the bar 10. A feature of the invention is the fact that the balanced position of the manikin may be changed. For example the saw 13 may be disengaged from the end of the support bar 11 by removal of pin 15 and then the manikin tilted frontwards or backwards as desired and the parts reconnected with the pin 15. Thus the manikin will now be in a new position. The device may also be rebalanced by a proper shifting of the weights 18 and 24. Still further the position of the manikin relative to the saw may be varied by the removal of the pin 19 and a reengagement of the pin through the manikin in a different one of the openings 20. The adjustments for the manikin produce entertainment which makes the toy exceedingly valuable.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. In a mechanical toy, a standard with a horizontal bar, and a structure transversely balanced on said horizontal bar comprising a manikin support bar having an end to the side of said horizontal bar and extending upwards, a saw beneath said manikin support bar, and having a top end, means for adjustably connecting the bottom end of said manikin support bar with said saw, a manikin figure adjustably pivoted on said manikin support bar and supported at one end upon said horizontal bar and having pivoted arms pivotally connected with the top end of said saw, a radially projecting stem swively mounted on the upper end of said manikin support bar, and a weight on the extended end of the stem.

2. In a mechanical toy, a standard with a horizontal bar, and a structure transversely balanced on said horizontal bar comprising a manikin support bar having an end to the side of said horizontal bar and extending upwards, a saw beneath said manikin support bar and having a top end, means for adjustably connecting the bottom end of said manikin support bar with said saw, a manikin figure adjustably pivoted on said manikin support bar and supported at one end upon said horizontal bar and having pivoted arms pivotally connected with the top end of said saw, and an egg-shaped weight having a stem engaging one of several openings along the length of said saw for aiding in balancing the said structure, said weight being adapted to be moved so that the stem engages different of said openings, and turned to vary its balancing effect.

3. In a mechanical toy, a standard with a horizontal bar, and a structure transversely balanced on said horizontal bar comprising a manikin support bar having an end to the side of said horizontal bar and extending upwards, a saw beneath said manikin support bar and having a top end, means for adjustably connecting the bottom end of said manikin support bar with said saw, a manikin figure adjustably pivoted on said manikin bar and supported at one end upon said horizontal bar and having pivoted arms pivotally connected with the top end of said saw, and a weight swiveled upon the top end of said manikin support bar.

JOSEPH VASS.